United States Patent [19]

Shiota et al.

[11] Patent Number: 5,686,051

[45] Date of Patent: Nov. 11, 1997

[54] OZONE WATER PRODUCTION APPARATUS

[75] Inventors: Hirokazu Shiota, Tokyo; Kazuo Kurihara, Yamato; Yasuyuki Takagi, Takasago, all of Japan

[73] Assignee: Kabushiki Kaisha Kobe Seiko Sho, Kobe, Japan

[21] Appl. No.: 555,406

[22] Filed: Nov. 9, 1995

[30] Foreign Application Priority Data

Nov. 11, 1994 [JP] Japan ................................. 6-303046
Nov. 11, 1994 [JP] Japan ................................. 6-303047

[51] Int. Cl.$^6$ ................................................. B01J 19/12
[52] U.S. Cl. ............................................... 422/186.14
[58] Field of Search ............ 204/176; 422/186.07–186.16

[56] References Cited

U.S. PATENT DOCUMENTS

| 5,205,994 | 4/1993 | Sawamoto et al. | 422/186.07 |
| 5,578,280 | 11/1996 | Kazi et al. | 422/186.07 |

FOREIGN PATENT DOCUMENTS

| 42 27 732 | 2/1994 | Germany. |
| 1-312092 | 12/1989 | Japan. |
| 3-155818 | 7/1991 | Japan. |
| 4-74281 | 11/1992 | Japan. |
| 6-41637 | 6/1994 | Japan. |
| 6-78592 | 10/1994 | Japan. |
| WO 93/24677 | 12/1993 | WIPO. |

*Primary Examiner*—Charles T. Jordan
*Assistant Examiner*—John R. Hardee
*Attorney, Agent, or Firm*—Oblon, Spivak, McClelland, Maier & Neustadt, P.C.

[57] ABSTRACT

Provided is an ozone water production apparatus capable of easily continuously obtaining ozone water having a high concentration by a water electrolytic process using a noble metal electrode which has been considered to have a low ozone generation efficiency without using a lead compound. An ozone water production apparatus in which an anode electrode and a cathode electrode to which a DC voltage is applied are put upon one surface and the other surface, respectively, of a solid electrolytic film, and water supplied to the anode electrode side is subjected to electrolysis to obtain ozone water, wherein a wire net made of noble metal having an ozone generation catalyst function is used as the anode electrode, and a lath net made of corrosion resistant metal is put upon the outer surface side of the anode electrode, the anode electrode and the lath net being sealed into a jacket having a water inlet on one end and an ozone water outlet on the other end thereof.

16 Claims, 8 Drawing Sheets

OZONE WATER PRODUCTION APPARATUS

BACKGROUND OF THE INVENTION

1. Field of the Invention

The present invention relates to an ozone water production apparatus for producing water into which ozone is dissolved, that is, ozone water.

2. Description of the Related Art

The following two typical processes have been heretofore known to obtain ozone water.

Ozone Aeration Process

Gas phase ozone having a high concentration and water are subjected to gas/liquid contact by suitable means such as aeration to dissolve ozone in water thereby obtaining ozone water.

Water Electrolytic Process

Attention has been paid to the fact that when ozone is mixed into oxygen generated on the anode side when water is subjected to electrolytic process, ozone is dissolved into water approximately 10 times of oxygen. Ozone generated by electrolysis of water is directly dissolved into water being subjected to electrolysis to obtain ozone water.

The aforementioned "Water electrolytic process" is proposed in Japanese Patent Laid-Open No. 3(1991)-267390 (hereinafter merely referred to as "prior application example") filed by the present invention, in which an anode electrode 2 and a cathode electrode 3 applied with a DC voltage are put upon one surface and the other surface of a solid electrolytic film 1, and water supplied to the anode electrode 2 side is subjected to electrolysis to obtain ozone water (although this apparatus not shown, reference numerals used herein are made to correspond to those used in Examples of this application). In this prior application example, an electrolytic cell constituted by the solid electrolytic film 1, the anode electrode 2 and the cathode electrode 3 is immersed into a water vessel having a predetermined capacity, and water in the water vessel successively flows through the anode electrode 2 side for circulation. Further, a jacket for covering the cathode electrode 3 is provided on the side of the cathode electrode 3 so that electrical shortcircuiting between the cathode electrode 3 and water in the water vessel is shut off, and hydrogen generated by electrolysis and remaining in the jacket is removed outside the water vessel.

Further, although an object is strictly different from that of the present invention, an ozone electrolytic production process as one process for obtaining gas phase ozone by electrolysis of water is proposed in Japanese Patent Laid-Open No. 01(1989)-312092 (hereinafter referred to as "second prior application") and the like. According to the claim of this second prior application, there is mentioned that "An ozone electrolytic production process characterized in that in producing ozone by water electrolysis, a porous electrode having a platinum layer on one side thereof is used as an anode, and a cation exchange film of a paphlorosulfonic acid type is placed in pressure contact with a platinum surface of the porous electrode for water electrolysis".

In this second prior application example, there is shown, in the column of Detailed Description of the Invention, that the following points are well known as prior art.

1. Platinum/cation exchange film/platinum

That is, it is well known that in order to obtain gas phase ozone by a water electrolytic process, a platinum anode electrode and a platinum cathode electrode are put upon one side and the other side, respectively, of a cation exchange film.

2. Platinum/cation exchange film/iridium or its oxide

That is, it is well known that in order to obtain gas phase ozone by a water electrolytic process, a platinum anode electrode and a cathode electrode of iridium or its oxide are put upon one surface and the other surface, respectively, of a cation exchange film.

3. When water is subjected to electrolysis using a platinum anode electrode, the platinum acts to facilitate an ozone formation reaction for ozonizing oxygen subjected to electrolysis. However, since a contact decomposition reaction occurs simultaneously therewith, an ozone formation quantity is extremely small.

Further, in the second prior application example, an example of apparatus for carrying out the process of the invention is disclosed in its accompanying drawings. Regretfully, however, its indication is too rough and structural parts thereof are not much explained in the Detailed Description of the Invention so that the detailed construction is not definite. It is however assumed that they may be as shown in FIG. 11 attached to the present application.

Figure 11:
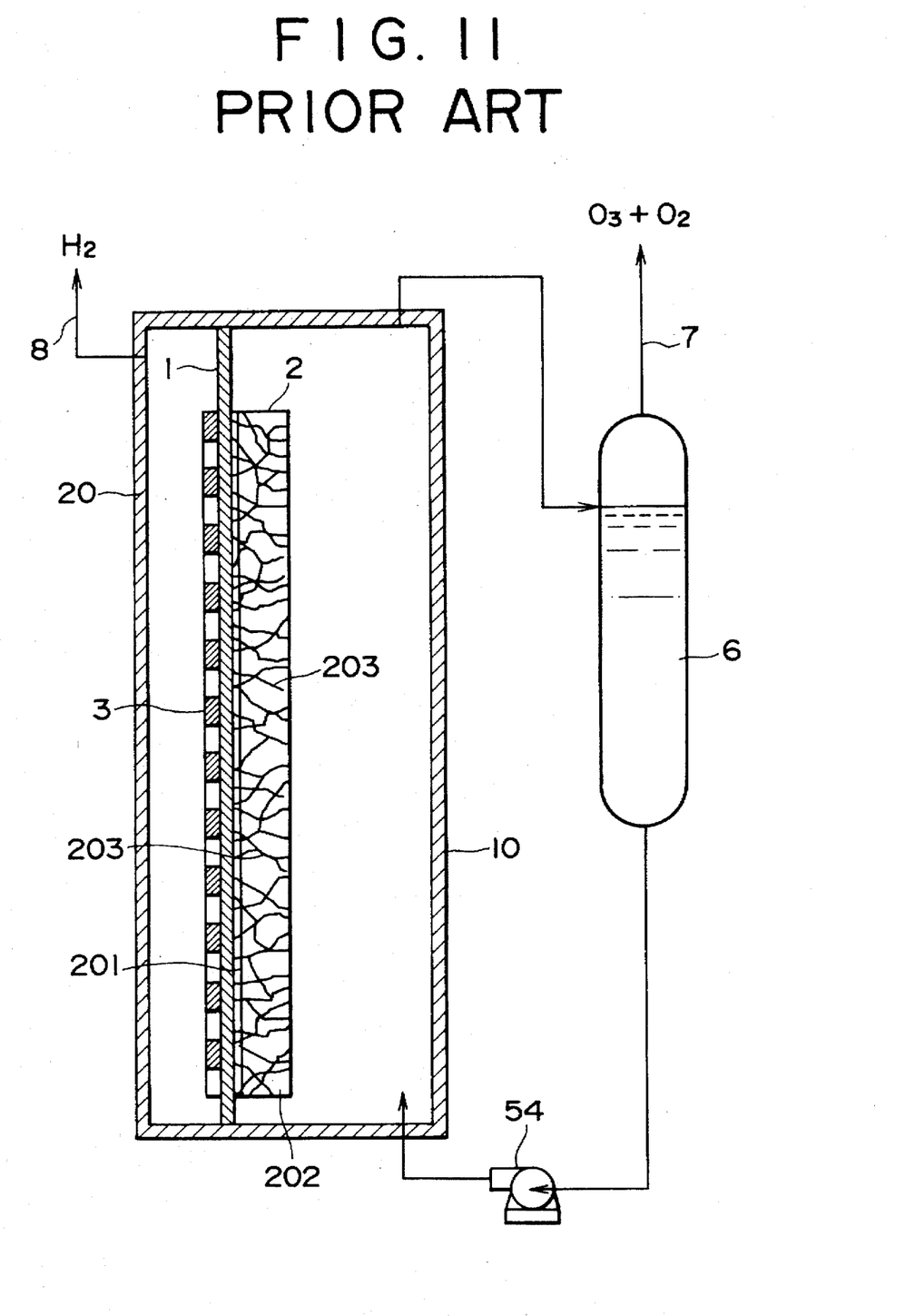
FIG. 11 is a sectional view of one embodiment of conventional apparatus for generating gas phase ozone in an electrolytic system.

That is, in FIG. 11, reference numeral 1 designates a solid electrolytic film in the present application; 2 an anode electrode; and 3 a cathode electrode. This anode electrode 2 is composed of a porous electrode material 202 made of titanium or the like (reference numerals 203, 203, 203 . . . in FIG. 11 denote through-holes) and a platinum layer 201 laminated on the porous electrode material 202. The anode electrode 2 is constructed such that the platinum layer 201 is placed in pressure contact with the solid electrolytic film 1 (the through-holes 203, 203, 203 . . . naturally come into communication with the platinum layer 201). The cathode electrode 3 is formed of suitable material (this is formed to be porous similar to the anode electrode 2) and placed in pressure contact with the other surface of the solid electrolytic film 1, and the solid electrolytic film 1 is sandwiched between the anode electrode 2 and the cathode electrode 3. One surface side of the solid electrolytic film 1 is covered with a jacket 10 called an end plate on the anode side, and water is successively supplied (so as to be circulated) by a pump 54 or the like into the jacket 10 whereby ozone generated in the form of foam is introduced to a gas separator 6 to separate and recover gas phase ozone 7 (correctly, ozone mixed oxygen). The other surface side of the solid electrolytic film 1 is covered with a jacket 20 called an end plate on the cathode side, and the jacket 20 is filled with water and hydrogen 8 generated by electrolysis is recovered or evacuated.

The above-described conventional ozone aeration process is suitable for obtaining ozone water having a high concentration and is at present a leading ozone water production apparatus. However, this system requires an ozonizer for producing gas phase ozone having a high concentration (normally, a discharge type ozonizer is used in which oxygen is allowed to flow in a corona discharge field to ozonize it). There exists a problem in that the ozonizer itself is large in size. Further, the ozonizer of this kind requires a high frequency high voltage power source and a power source device is also large in size. Moreover, it is necessary to prepare a cylinder for pure oxygen as raw material gas, thus making the entire apparatus very large. There further exists a problem in that handling is cumbersome. Of course, air can be used as raw material gas. In this case, however, in order that ozone having a high concentration is obtained, it is necessary to install a dehumidification device for air, and an oxygen concentration device in which oxygen in air is adsorbed and deaired by an adsorbent such as zeolite under the predetermined pressure condition to increase the concentration of oxygen.

On the other hand, in the water electrolysis process, there are merits such that water as raw material is easily available, and a power source is suffice to be scores of volts and scores of amperes so that a power source device is small. However, this system is not suitable to obtain ozone water having a high concentration. That is, in the water electrolytic process using noble metal electrodes, most of electric power is consumed for electric decomposition of water into oxygen and hydrogen and a percentage thereof used for form ozone is less than a few percent. In the management in prior application example, it took about one hour to make 5 liters of water into 10 ppm of ozone water. There existed a problem in that in order to continuously obtain ozone water having a high concentration by the aeration process in the water electrolytic process of this kind, there is required a complicated gas/liquid separator (it is necessary to once separate gas phase ozone in order to prevent water from being contaminated by lead), using a $\beta$ phase $PbO_2$ process described later, and a gas/liquid mixer (which allows gas phase ozone to dissolve into water which is not contaminated by lead).

2 to 3 ppm of ozone water is effective for sterilization of colibacillus, activation of a plant, and the like but is not much effective for sterilization of other bacteria having a strong antibiosis. In addition, it cannot expect much effect for bleaching and deodorizing. It is desirable to supply a large quantity of ozone water having a high concentration of 5 ppm or more, preferably 7 ppm or more. Therefore, there exist a problem in that such demands as noted above cannot be fulfilled by the water electrolytic process using a conventional simple device.

According to the process of the aforementioned second prior application example, as described in its specification, the highest concentration of ozone gas is 0.5%. It has been assured by experiments that even if the ozone gas having the concentration as described is most effectively dissolved into water at normal temperature, 20° C., ozone water having 3 ppm of concentration at the maximum can be merely obtained.

Of course, in other water electrolytic process, for example, the well known $\beta$ phase $PbO_2$ process, namely, a water electrolytic ozone generation process in which lead dioxide is used for an anode, it is possible to obtain an ozone gas having a superhigh concentration of 15 to 17% of ozone gas concentration. By using this, ozone water having a high concentration, 10 ppm or more, can be produced.

However, the above-described $\beta$ phase $PbO_2$ process has a great disadvantage. That is, the $\beta$ phase $PbO_2$ process has an extremely unstable construction. For example, if energization stops due to a power failure, a phase change from $\beta$ to $\alpha$ starts in a moment. When the phase change from $\beta$ to $\alpha$ occurs, the ozone generation efficiency becomes ⅓ or so, and in case of normal lead dioxide, ozone is no longer generated. Accordingly, there existed a problem in that even when not in use, a back-up power source for maintaining the phase is required.

Furthermore, since the $\beta$ phase $PbO_2$ process uses lead, cumbersomeness involves such that an ozone gas is once removed from water and is again dissolved into water which is not contaminated by lead in order to avoid contamination caused by a lead compound disengaged from the electrode. There further exists a problem in that at present the porous $PbO_2$ is so fragile that it tends to become collapsed in use for a long period of time, impairing the spread.

SUMMARY OF THE INVENTION

A primary object of the present invention is to provide an ozone water production apparatus capable of easily continuously obtaining ozone water having a high concentration by a water electrolytic process using noble metal electrodes whose ozone generation efficiency is considered to be low without using a lead compound such as $PbO_2$ or the like.

According to a preferred mode of embodiment of the present invention, there is provided an ozone water production apparatus in which a DC voltage is applied to an anode electrode and a cathode electrode so that raw material water supplied to the anode electrode side is subjected to electrolysis to thereby produce ozone water, the apparatus comprising:

a solid electrolytic film;

a cathode electrode placed in pressure contact with the other surface of said slid electrolytic film;

an anode electrode comprising a wire net made of noble metal having an ozone generation catalyst function placed in pressure contact with one surface of said solid electrolytic film;

a lath net made of corrosion-resistant metal put upon an outer surface side of said anode electrode; and an anode jacket into which said anode electrode and said lath set are sealed and having a water inlet on end and an ozone water outlet on the other end.

In the mode of the preferred embodiment as described above, since the anode electrode formed from a wire net having an ozone generation catalyst function and the lath net made of corrosion-resistant metal put upon the outer surface side of said anode electrode are sealed into the anode jacket, raw material water supplied to the anode jacket moves through a narrow gap connecting the meshes together of the anode electrode and the lath net whereby a branch flow, a change in direction and an eddy current occur for a violent agitation. Accordingly, it is possible to always supply water to an electrolytic region between the anode and the solid electrolytic film where ozone generates. Further, ozone which is an electrically poor conductor generated in the anode is swept into water due to the eddy current thereof to maintain a good electric conductivity.

DESCRIPTION OF THE PREFERRED EMBODIMENTS

Figure 1:
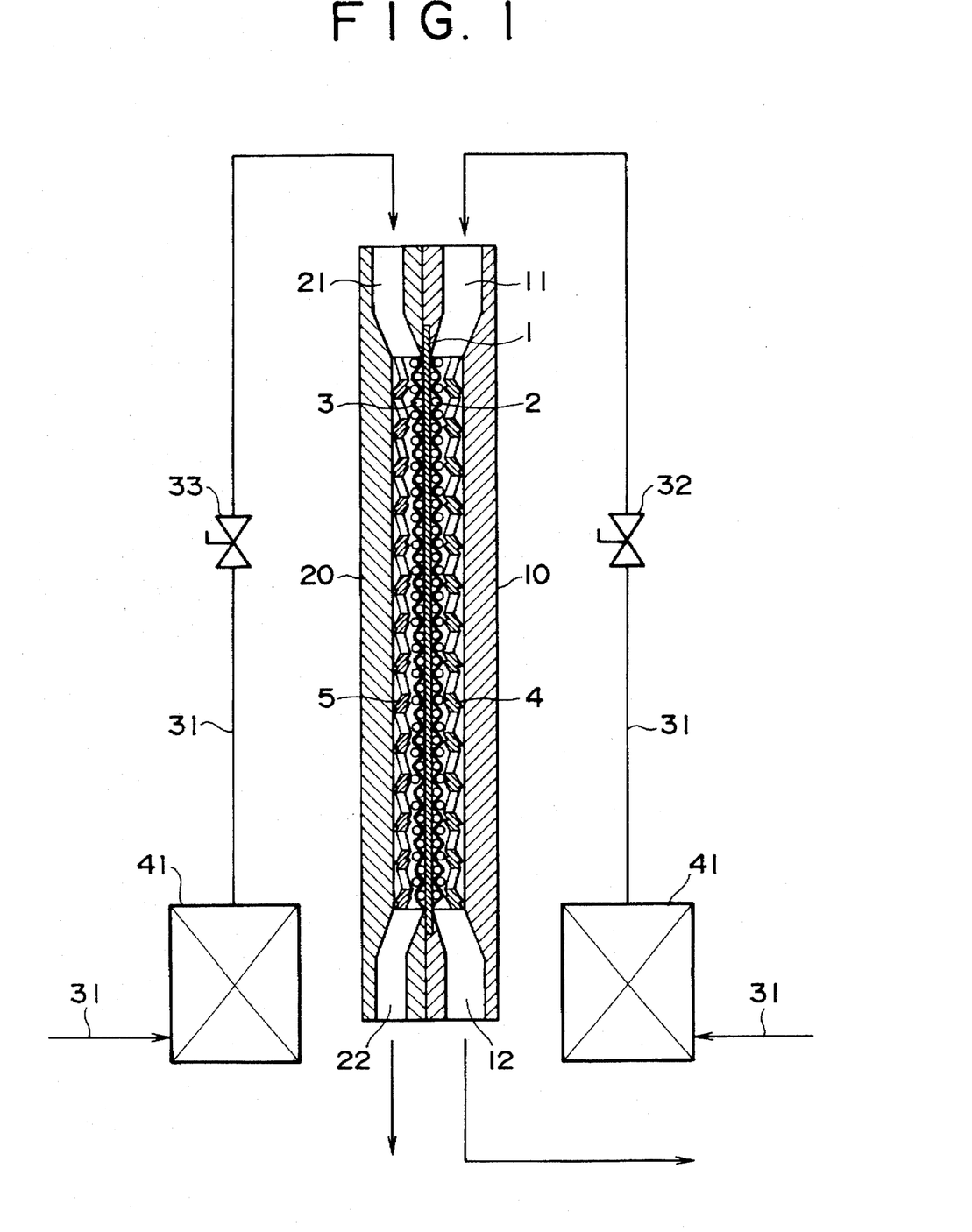
FIG. 1 is a longitudinal sectional view of essential parts showing one embodiment of the ozone water production apparatus according to the present invention.

Embodiments according to the present invention will be described hereinafter with reference to the accompanying drawings. FIG. 1 is a longitudinal sectional view of essential parts showing one embodiment of an ozone water production apparatus according to the present invention, which is the same as prior art in that in the figure, reference numeral 1 designates a solid electrolytic film, and an anode electrode 2 and a cathode electrode 3 are put upon one surface and the other surface, respectively, of the solid electrolytic film 1, and water supplied to the anode electrode 3 side (more correctly, both water supplied to the anode electrode 2 side and water supplied to the cathode electrode 3 side) is subjected to electrolysis (on the anode electrode 2 side) to obtain ozone water.

That is, the anode electrode 2 is put upon one surface of the solid electrolytic film 1, the cathode electrode 3 is placed upon the other surface thereof, and an outlet and of a power source device not shown is electrically connected between the anode electrode 2 and the cathode electrode 3 to apply a DC voltage, which is the same as prior art. The anode electrode 2 and the cathode electrode 3 are not superposed so as to wholly conceal the solid electrolytic film 1 but a number of through-holes are provided in communication with each surface of the slid electrolytic film 1 from the electrode surface, as in the porous electrode termed in the second prior application example, and the anode electrode 2 and the cathode electrode 3 are superimposed with the solid electrolytic film 1 provided with a contact portion and a non-contact portion so that water supplied to the anode electrode 2 side and the cathode electrode 3 side of course come in contact with the anode electrode 2 or the cathode electrode 3 and also come in direct contact with the solid electrolytic film 1 by the through-holes, which is the same as prior art.

The above-described solid electrolytic film 1 used is well known, and for ozone generated, a fluorine family cation exchange film having a high durability (in the present embodiment, use was made of a film having a thickness of 300 micron·10 cm×17 cm) can be used.

In the present invention, a wire net made of noble metal having an ozone generation catalyst function is used for the anode electrode 2, on the outer surface of which is put a lath net 4 made of corrosion-resistant metal.

Noble metals having an ozone generation catalyst function known include Au, Pt, etc., and in the present invention the wire net is made of these noble metals. While in the present embodiment, platinum is used for the anode electrode 2, it is to be noted that the use of platinum for the electrode of this kind has been well known. The use of the wire net for the anode electrode 2 has been proposed in the prior application example. However, in the prior application example, attention has been paid merely to the fact that the wire net has the meshes used as a number of through-holes, but in the present invention, attention has been paid to a circular shape in section of wires which are members constituting a wire net and to the fact that the wire net has a water permeability also in a direction parallel with the surface direction. In the present embodiment, the anode electrode 2 was formed by weaving platinum wires having 0.4 mm of a diameter into 80 meshes.

Figure 5:
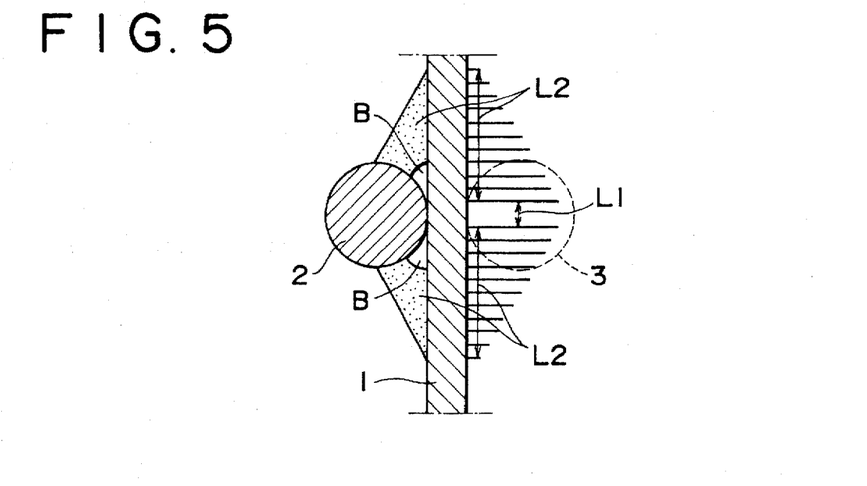
FIG. 5 is a sectional view for explanation of operation schematically showing the step of generating electrolysis according to the present invention.
Figure 6:
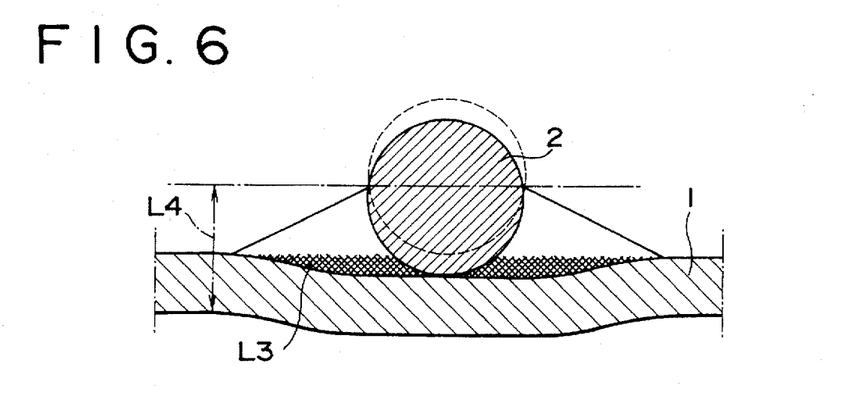
FIG. 6 is a sectional view for explanation of operation in a separate mode of embodiment schematically showing the step of generating electrolysis of the present invention.

First, since wires constituting the wire net have a circular shape in section, when the wire net is put upon the solid electrolytic film 1, a portion L2 apart in distance relative to the solid electrolytic film 1 from a contact portion L1 can be formed as shown FIG. 5, and since the wire net has a number of convex-concave portions on both surfaces thereof, a number of portions L2 apart in distance relative to the solid electrolytic film 1 from the contact portion can be likewise formed to form a narrow gap between the anode electrode 2 and the solid electrolytic film 1. Since there are present a number of narrow gaps between the anode electrode 2 and the solid electrolytic film 1, a large volume of water can be positioned at a part of that gap, said part coinciding with a powerful electric filed generating place necessary for electrolysis.

Further, since the wire net has a number of meshes, of course it has a water permeability in a direction crossing the surface. Further, since the wire net has a number of convex-concave portions on both surfaces thereof, this can be sandwiched, for example, by two plates to enable water to pass therebetween. In other words, there is a water permeability also in a direction parallel with the surface of the wire net, and fresh water can be always supplied to a number of narrow gaps between the anode electrode 2 and the solid electrolytic film 1.

However, if a design is made so that water can flow outside the anode electrode 2 formed from the wire net as in prior art in a direction parallel with the surface of the wire net, even if the wire net has a water permeability in a surface direction, that portion is very large in pressure loss and therefore, it is difficult for water to flow in the surface direction within the wire net.

Figure 2:
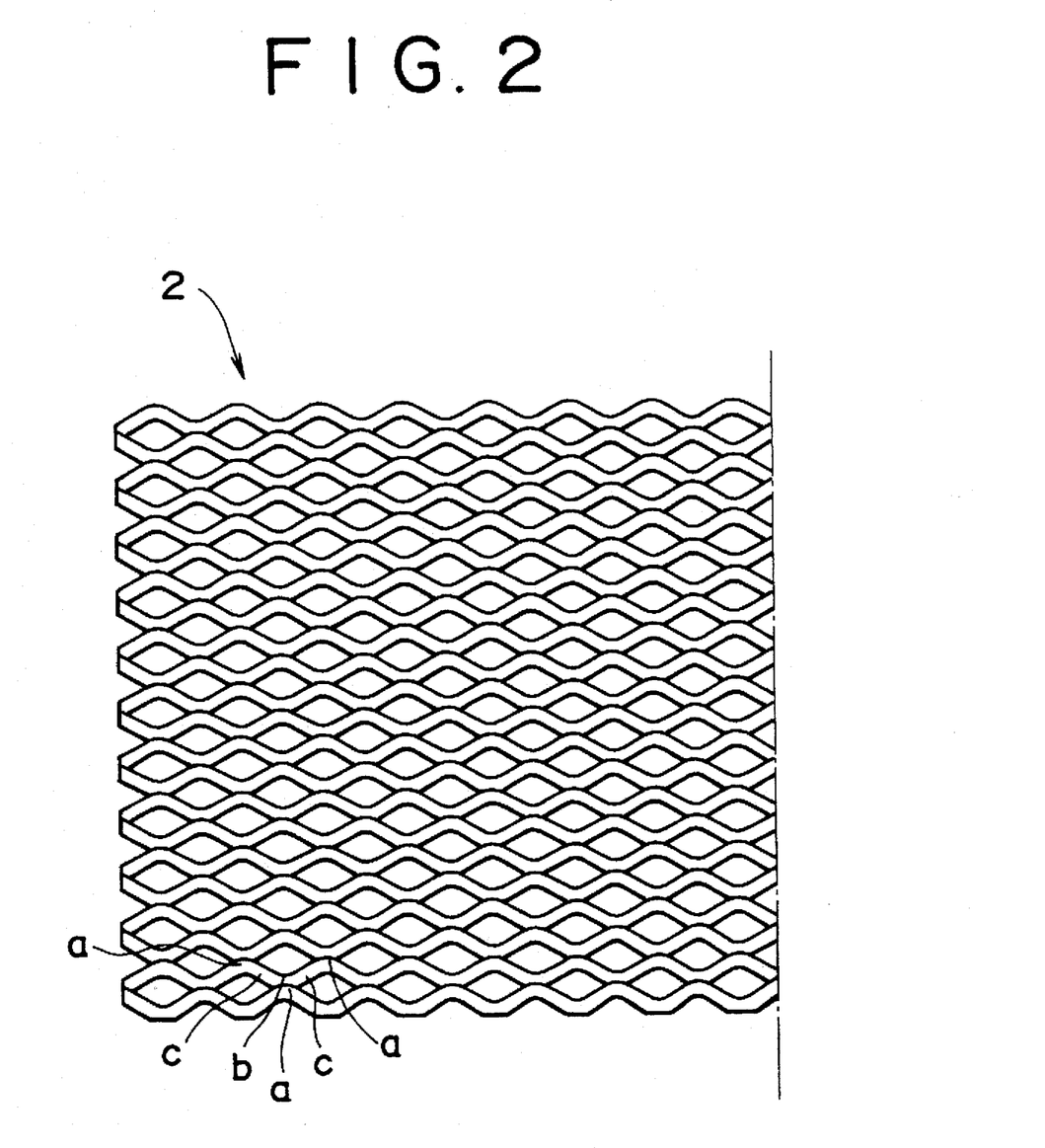
FIG. 2 is a partial plan view of a lath net used in the present invention.

In view of the foregoing, according to the present invention, a lath net 4 made of corrosion resistant metal (the corrosion resistance termed herein means the ozone (water) resistance is put upon the outer surface of the anode electrode 2 to integrate the anode electrode 2 with the outside thereof. This lath net 4 is formed by enlarging a metal plate provided with a number of slits in a staggered manner so as to form the meshes, in which in FIG. 2, a part a is the highest level portion, a part b is a lower level portion located above the highest level portion a, which is lower by one stage than the a (or the extreme end side is inclined to be lowered gradually), and mesh portions c, c extending obliquely upwardly toward both sides from the lower level portion b are inclined so that the extreme and sides thereof gradually become high so as to reach the highest level portions a, a.

The metal plate used for the lath net 4 has a fixed thickness, and the back side thereof has a similar shape. Accordingly, the lath net 4 will be a net composed of a plate and has an external shape which is substantially similar to a wire net formed by weaving wires. This results in not only the water permeability in a direction crossing the surface but also the water permeability in a direction parallel with the surface. That is, more specifically, water can be moved (flowed) from bottom to top of FIG. 8.

In the present embodiment, a titanium plate having 1 mm of thickness was used for the lath net 4, and the titanium plate was processed into a lath net having approximately 50% of an opening rate and approximately 2 square cm of meshes and after this, the maximum thickness will be 1.8 mm. This lath net 4 has a function as a dust collecting electrode and a function as a keep plate for holding the easily bendable anode electrode 2 which is placed in uniform pressure contact with the solid electrolytic film 1.

In the present invention, the anode electrode 2 and the lath net 4 are sealed into a jacket 10 having a water inlet 11 and an ozone water outlet 12 on one and the other end, respectively, thereof.

The "sealed into" termed herein means that the anode electrode 2 and the lath net 4 are snugly put into the jacket 10 without allowance. When a large allowance portion is provided within the jacket 10, water flows through only the allowance portion (a portion where pressure loss is least) through which water easily flows. Therefore, the allowance portion is eliminated so that all the water flowing into the jacket 10 from the water inlet 11 flows out of the ozone water outlet 12 passing through the anode electrode 2 and the lath net 4.

Figure 3:
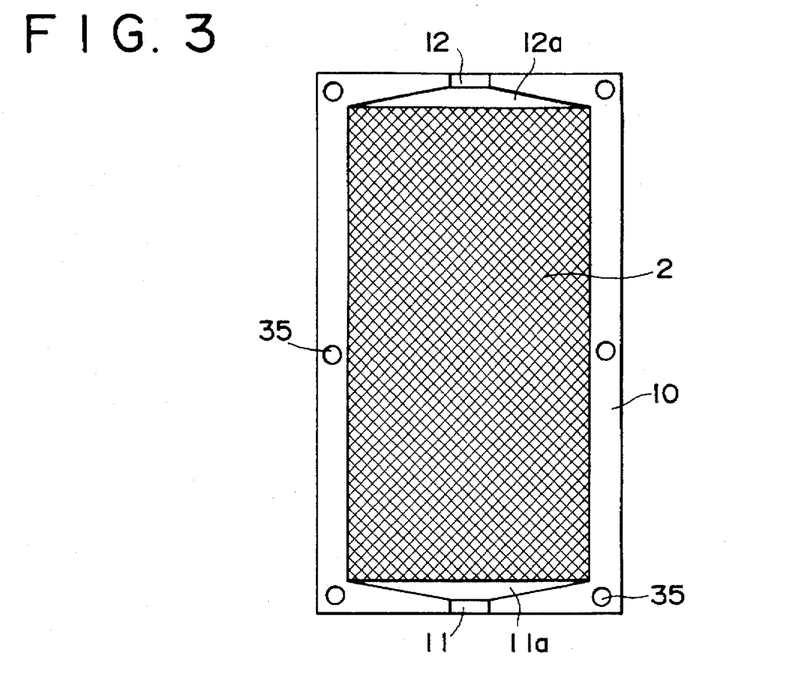
FIG. 3 is a rear view in a state where one jacked is removed.

Even the "sealed into", all the water will suffice to flow into the anode electrode 2 and the lath net 4, and the "sealed into" is important in a direction of water flow-path section. In the example shown in FIG. 3, a guide path 11a in which a flow path width is gradually widened to the width of the anode electrode 2 and the lath net 4 is provided at downstream of the water inlet 11. The interior of this guide path 11a may have a hollow portion so that the anode electrode 2 and the lath net 4 are not received therein. Such a guide path 11a is the conventional means for allowing the fluid to evenly flow through the jacket 10. When water is directly supplied to the jacket 10 having a larger diameter than a small-diameter water supply pipe, water flow is impeded in the vicinity of and laterally of the water inlet 11, and the function of the anode electrode 2 cannot be effectively used at the surface part. It is therefore of course desirable that water in an even quantity may flow any place within the jacket 10. An outflow guide path 12a for gradually narrowing a flow-path width from inside of the jacket 10 is provided at upstream of the ozone water outlet 12, interior of which also has a hollow portion.

Figure 4:
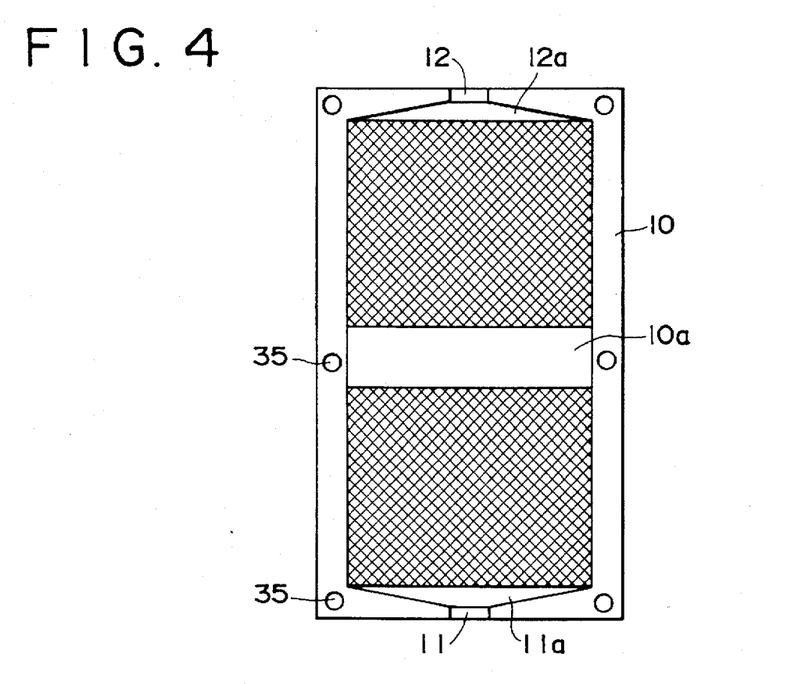
FIG. 4 is a rear view of a further embodiment in a state where one jacket is removed.

Further, in the example shown in FIG. 4, both or either of the anode electrode 2 or the lath net 4 is omitted in the central portion in the flowing direction of water within the jacket 10, and a hollow portion 10a is provided in the central portion. However, also in this part is continuously received the solid electrolytic film 1. The hollow portion 10a reduces an effective area of the anode electrode 2, but the hollow portion 10a increases a diameter of the flow path for a portion in which the anode electrode 2 and the lath net 4 are not present. Therefore, the flow velocity becomes low so that the agitating effect can be expected, and in addition, the function for securing the time at which ozone is dissolved into water can be expected.

Even if the guide path 11a, 12a or the hollow portion 10a are provided as described above, or even if a hollow portion corresponding to the aforementioned hollow portion 10a is provided at upstream or downstream of the water flow of the anode electrode 2 and the lath net 4 though not shown, all the water flows through the anode electrode 2 and the lath net 4 as it turns out unless those hollow portions provide a communication between the water inlet 11 and the ozone water outlet 12. Therefore, such a configuration as described is also called "sealed into" in the present application. Although not shown, a plurality of the lath nets 4 in the form of a laminate may be sealed into the jacket 10.

When all the water flowing through the jacket 10 having the water inlet 11 and the ozone water outlet 12 on one end and the other end, respectively, thereof, the water flows while complexly changing the flowing direction seeking for a slight gap portion between the anode electrode 2 and the lath net 4. That is, water fed under pressure into the jacket 10 is to flow through a complicated mass-like flow path while changing the direction seeking for a slight gas flow path. Especially, the mesh portion of the lath net 4 is larger in the diameter of the flow path than other small gap flow paths of the lath net 4 through which water can pass and is large in volume of the hollow portion. Further, since the net wire portions c, c are twisted, water flowing into the meshes results in a current in a whirl, that is, an eddy current. This eddy current occurs in proximity to the anode electrode 2. Further, since the anode electrode 2 uses the wire net, water on the surface of the solid electrolytic film 1 can be dragged in, and this eddy current reaches the surface of the solid electrolytic film 1 to give rise to a flow along the surface of the solid electrolytic film 1, whereby water can flow without stagnation even to a slight gap part between the anode electrode 2 and the surface of the solid electrolytic film 1.

That is, the anode electrode 2 and the lath net 4 in a laminate form are sealed into the jacket 10 because the anode electrode 2 is made to have the meshes as small as possible to secure many interface portions between a contact portion and a non-contact portion of the solid electrolytic film 1 and the anode electrode 2. If the interior of the jacket 10 merely comprises the anode electrode 2 having the dense meshes, the pressure loss unavoidably increases so that water in the narrow gap portion between the slid electrolytic film 1 and the anode electrode 2 becomes hard to flow, and water is stagnated in this narrow gap portion.

However, when the flow path portion through which water with less pressure loss easily flows is provided externally of the anode electrode 2, water becomes increasingly hard to flow down through the wire net. Thus, the main object of the lath net 4 is to eliminate the above-described stagnation, which is overcome by the provision of an arrangement wherein for the reasons that the lath net 4 has the relatively large meshes and the wire net portions c, c are twisted, water flowing through the lath net 4 in the surface direction forms an eddy current at each of the meshes to drag in even water in the narrow gap portion between the solid electrolyte film 1 and the anode electrode 2.

The passage of water through a complicated maze is to secure the frequency of gas/liquid contact due to the agitating force. Further, the eddy current quickly takes in foams generated in a very narrow gap relative to the anode electrode 2 to secure the state in which much electric current flows between the anode electrode 2 and the solid electrolytic film 1 (more correctly, between the anode electrode 2 and the cathode electrode 3).

Next, the construction of the cathode electrode will be described. A wire net made of metal is used for the cathode electrode 3, a lath net 5 made of corrosion resistant metal is put on the outer surface of the cathode electrode 3, the cathode electrode 3 and the lath net 5 being sealed into a jacket 20 having a water inlet 21 and a water outlet 22 on one end and the other end, respectively, thereof.

That is, in the water electrolytic process of this kind, hydrogen is generated on the side of the cathode electrode 3. At the outset of development, the cathode electrode 3 side is exposed to the atmosphere to confirm the generation of a fine amount of ozone for the present. There has been found a phenomenon that when the other surface side of the solid electrolytic film 1 is wetted, the amount of ozone generation extremely rises. Recently, the cathode electrode 3 side is also put into water or is allow to pass through water. That is, in the case where even if a flow of electric current is made to easily pass through only an inlet on the anode electrode 2 side but if it is hard to pass through the cathode electrode 3 side, the current is hard to flow as a consequence. Therefore, in order that the electric current is made to flow as easy as possible also on the side of the cathode electrode 3, the cathode electrode 3 side is made to have substantially the same configuration as that of the anode electrode 2 side, as a consequence of which ozone is generated very effectively. For the cathode electrode 3, corrosion resistant metals such as platinum, gold, silver, iridium, etc. can be used (since the cathode electrode 3 side does not generate ozone, there is no need to be ozone resistant), preferably, good conductive metal. In the present embodiment, Ag (silver) was used.

The above-described jackets 10 and 20 are formed of water-proof materials having the ozone resistant water quality, for example, such as Teflon or glass (A material having the ozone resistant water quality coated thereon may be used for the inner surface of metal. Although an acrylic material is supposed to have the ozone resistance, it has not so good durability for the ozone water), and a two-split box-like configuration for holding the solid electrolytic film 1, the anode electrode 2 and the cathode electrode 3 is formed in the central portion thereof. Although not shown, both the jackets 10 and 20 are connected and fixed each other by fastening screws (in FIG. 3 and FIG. 4, reference numeral 335 designates an insert hole for the fastening screw) or various well known binder mechanisms and the like.

While in the past, for water as raw material, pure water having passed through distilled water or ion exchange resin was used, water having some electrolyte dissolved therein was used in the present embodiment. That is, in FIG. 1, reference numeral 1 designates a water supply pipe. The upstream end of the water supply pipe 1 is connected to a city water supply end through a filter 41 for adsorbing and removing chlorine in the city water. This water supply pipe 31 is connected to the water inlets 11 and 21 of the jackets 10 and 20, respectively, but flow control valves 32 and 33 are interposed halfway so that the quantity of water supplied may be controlled.

Next, the operation of the ozone water production apparatus according to the present embodiment will be described.

In the ozone water production apparatus according to the present invention, a DC voltage is applied between both the electrodes 2 and 3 to supply water from the water inlet 21 into the anode jacket 10 and the cathode jacket 20. Then, water is subjected to electrolysis so that oxygen and ozone are generated on the side of the anode electrode 2 and hydrogen is generated on the side of the cathode electrode 3. The thus generated ozone is dissolved in water to form ozone water, which flows out of the ozone water outlet 12, in the conventional manner. By the electrolysis of water, hydrogen generated on the side of the cathode electrode 3 is formed into foams, which flow out together with water from the water outlet 22 of the jacket 20.

In the present invention, water passes through the jacket 10, in other words, the anode electrode 2 side, without staying or circulation within the water vessel having a predetermined volume, as in the prior application example. Accordingly, the frequency of gas/liquid contact lowers by a portion that the flowing time is short. However, since the anode electrode 2 and the lath net 4 are sealed into the jacket 10 in a superposed form, all the water supplied into the jacket 10 from the water inlet 11 moves forward through the narrow gap connecting the meshes of the anode electrode 2 and the lath net 4. The water repeats a branch flow, a change in direction, a generation of eddy current, a joining, etc. evey passage of each mesh part and flows through a very complicated flow path. The water passes through a flow path like a complicated mass through the passage and becomes violently agitated so as to increase the frequency of gas/liquid contact.

Figure 8:
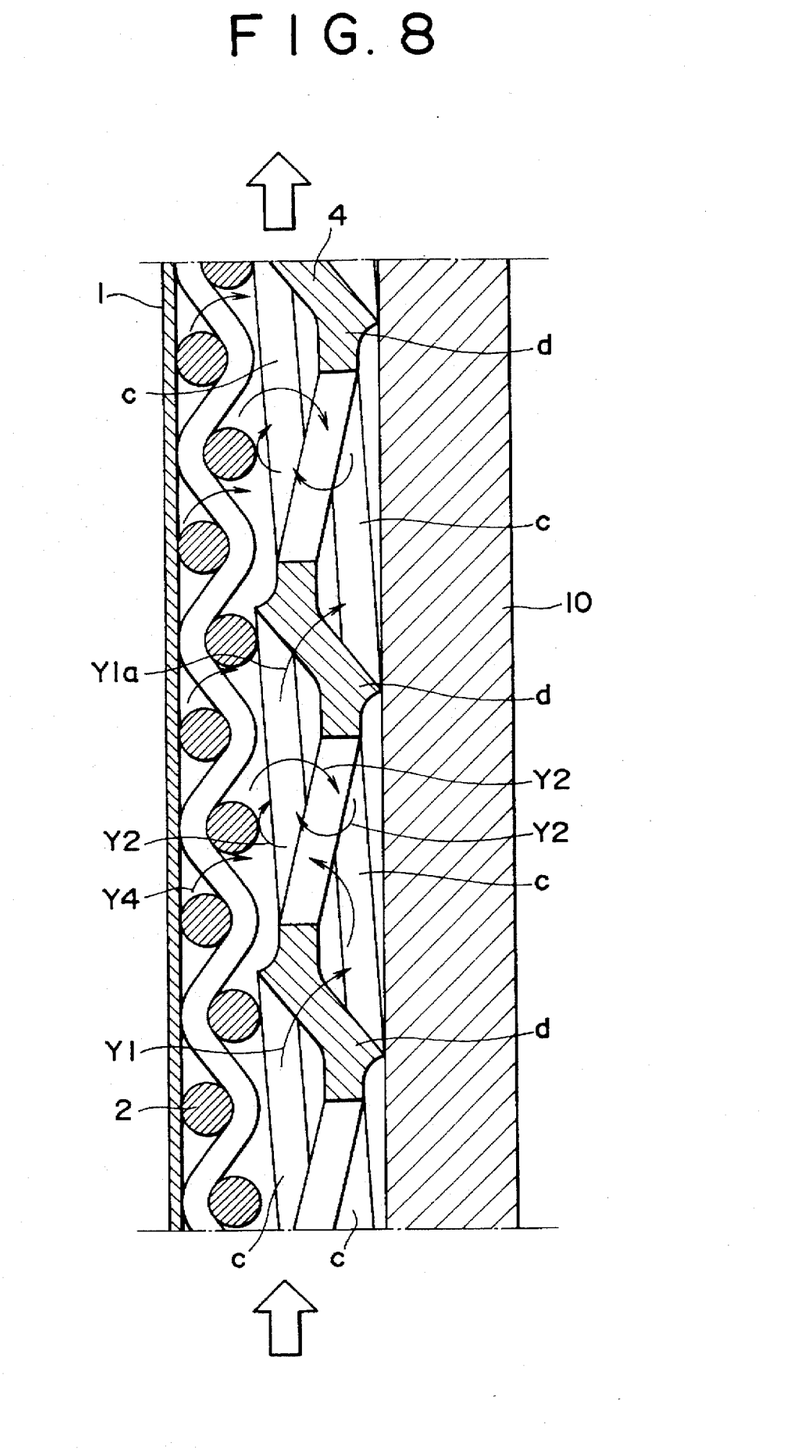
FIG. 8 is an enlarged view of essential parts for explaining a flow of water according to the present invention.

The flow of water within the anode jacket 10 will be described with reference to FIG. 8. When water is fed under pressure from bottom toward top in the figure, since the anode electrode 2 has the narrow meshes whereas the lath net 4 has the coarse meshes, water mainly flows through the net 4 side with less pressure loss, the anode electrode 2 being filled with water, and some water flows therethrough. When water flowing through the lath net 4 side impinges upon the intersection portion d and the wire portions c, c of the lath net, the water changes in direction to avoid these portions, part of which is branched upon impingement and flows into the meshes on the downstream side under the intersection portion d and the wire portions c, c of the lath net as indicated by the arrow Y1. Since the intersection portion d and the wire portions c, c of the lath net 4 are applied with a predetermined twist in a flowing direction of water, water flows along the twist, and the flow in a vertical direction in FIG. 8 changes in direction of flow to left and right oblique directions in the figure. The flow in the surface of the anode jacket 10 to change the direction of the flow to the opposite side, and then the flow impinges upon the anode electrode 2 or the solid electrolytic film 1 to change the direction of the flow to the opposite side again so that the water flows in a staggered manner. When the meshes are large, part of the water flow forms eddy currents as in arrows Y2, Y2 and Y2, and part thereof further flows downstream as indicated by arrow Y1a. This eddy currents acts to drag in water on the side opposite to the lath net 4 of the anode electrode 3 formed from a wire net as indcated by arrow Y4.

When the water flow flows from the meshes of the lath net 4 into the other meshes, the flow direction is forcibly changed by members constituting the net to generate a number of eddy currents as described above. The eddy currents come in contact with or close to the surface of the solid electrolytic film 1 and are generated since the anode electrode 2 also uses the wire net. This eddy current is small in size but can make its flow velocity considerably faster than the water inlet 1 according to the flow velocity of water supplied into the anode jacket 10 to present the action in which ozone or the like generated by the strong eddy current is swept into the flowing water from the surface of the solid electrolytic film 1.

That is, in the anode electrode 2, ozone an oxygen are generated in the vicinity of the interface with a portion away from a portion in contact with the solid electrolytic film 1. FIG. 5 schematically shows a situation of the generation of oxygen and ozone. The ozone electrode 2 having a circular section (more correctly, the constituting member of the anode electrode 2) is in contact with the solid electrolytic film 1, and a close contact portion L1 in which both of them are completely in close contact is free from occurrence of electrolysis since water is not present halfway thereof. However, since the anode electrode 2 is formed from a wire net, a metal wire has a circular section. Therefore, the distance between the anode electrode 2 and the solid electrolytic film 1 gradually increases as leaving from the close contact portion L1. The strongest electrolysis occurs at a part closest to the close contact portion L1, and the amount of electrolysis becomes less as leaving from the close contact portion L1, the amount of electrolysis being indicated by a horizontal straight line on the right side of FIG. 5. In FIG.

5, a part indicated by reference numeral L2 designates a place where electrolysis occurs. It was observed that the place where electrolysis occurs L2 was at a short distance, 50 to 200 microns, on one side depending upon the diameter of the anode electrode 2 and the intensity of electric field.

When the electrolysis occurs, oxygen with ozone mixed is formed into a foam B, which is adhered to the above-described place L2 on the solid electrolytic film 1 due to the surface tension of water. As the electrolysis progresses, the foam B is gradually grown and inflated, and finally the foam B becomes larger in buoyancy than the surface tension and moves away from the solid electrolytic film 1.

However, it has been found that since the foam B is a poor electric conductor, when a number of a large amount of foams B are always present in the place where electrolysis occurs L2 where the electric field is so intensive that electrolysis tends to occur, an electric current is hard to flow to present the action in which even if a voltage is applied, the current does not flow and the electrolysis is hard to occur. That is, in the conventional water electrolytic system, the place where the electrolytic efficiency is best has not been used.

However, in the present invention, a small eddy current occurs in the place where electrolysis occurs L2 and in the neighborhood thereof. Therefore, foams generated in the form of fine foams in the interface are swept by the eddy current, and immediately disengaged from the aforesaid place L2. Fresh water in place thereof is supplied to that part to keep a good conductivity.

In a voiceless discharge type ozonizer for forming gas phase ozone, it is known that when ozone stays in an intensive electric field for a long period of time, oxygen is ozonized, and a part of ozone is decomposed and further ozonized, which reaction is repeatedly carried out and the staying of ozone in the intensive electric field for a long period of time is not always effective. However, in the case where ozone was dissolved in water, the action in which ozone is dissolved under the influence of the electric field is hardly considered, and there presents the action in which ozone generated by electrolysis does not immediately come into contact with water but is formed into liquid phase ozone (dissolved ozone) whereby preventing ozone from redissolution due to the electric field for electrolysis.

Figure 7:
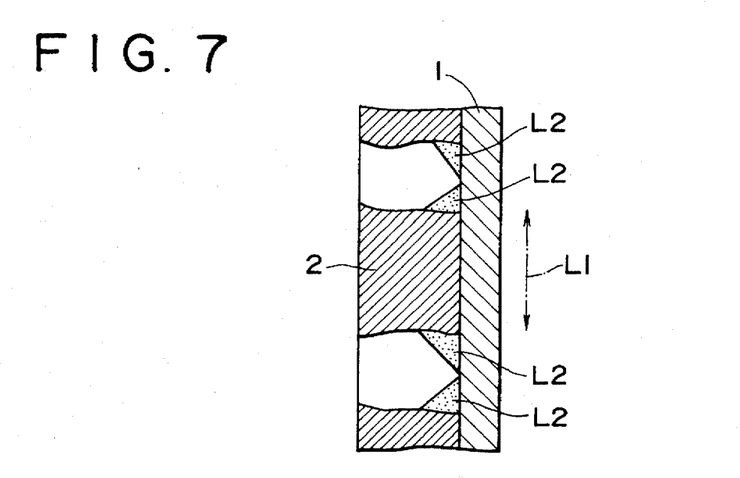
FIG. 7 is a sectional view for explanation of operation schematically showing the step of generating a conventional electrolysis.

The place where electrolysis occurs L2 according to the present invention is as described above, as compared to which the case where a conventional porous electrode is used as shown in FIG. 7, in which the end of the anode electrode 2 is in the form of a wall vertical relative to the solid electrolytic film 1, and the place where electrolysis occurs L2 is 10 to 50 microns. Thus, the place where electrolysis occurs L2 according to the present invention presents the action in which the distance is enlarged a few times, and the volume is enlarged scores of times.

Further, in the embodiment, since the anode electrode 2 is placed under pressure in contact with the solid electrolytic film 1, the solid electrolytic film 1 is locally depressed by the pressing force thereof, but since the solid electrolytic film 1 has a rigidity, this depression does not always come into contact with the outer surface of the anode electrode 2 but the radius of the depression becomes larger than that of the anode electrode 2 to present the action in which a discharge field capacity increasing portion is formed as indicated by reference numeral L3 in FIG. 5.

The action in which a large quantity of water is made to flow into the intensive electric field is on the assumption that the electric conductivity of water is guaranteed to some extent. In the case where water having a low electric conductivity like pure water is used, this action does not remarkably appear.

Further, in the present embodiment, a metal is used for the cathode electrode 3, the lath set 5 made of corrosion resistant metal is put upon the outer surface of the cathode electrode 3, and the cathode electrode 3 and the lath net 5 are sealed into the jacket 20 having the water inlet 21 and the water outlet 22 on one end and the other end, respectively, thereof. There presents the action in which a number of fine eddy currents occur similarly to the anode electrode 2 side, and hydrogen generated by electrolysis is immediately swept from the generated place, and there like presents the action to prevent the phenomenon in which hydrogen which is a poor electric conductor is interposed between the cathode electrode 3 and the solid electrolytic film 1 to impair the electrolysis.

Further, calcium and the like dissolved into water are separated and accumulated on the cathode electrode 3 but the eddy current presents the action of preventing the accumulation by the agitating force thereof to the utmost. In the conventional example, pure water is normally used as water of raw material. This is because of the fact that since the solid electrolytic film 1 is used, an electric current flows even into pure water and electrolysis can be made, thus being suitable to use pure water in which chlorine or calcium is not mixed in order to obtain gas phase ion. However, since in the present invention, the electric field is positively used at the part in which the anode electrode 2 is distanced from the solid electrolytic film 1, it is preferable to use city water or natural water or those capable of securing somewhat electric conductivity such as water in which city water or natural water is introduced into an active coal layer to remove chlorine and calcium, and silica and the like somewhat remain, not pure water. Accordingly, after operation for a long period of time, calcium or the like is separated on the side of the cathode electrode 3, but when these are accumulated on the cathode electrode, the conductivity is lowered. In the present invention, there presents the action in which the accumulation thereof is presented by the fine eddy current.

Next, another embodiment will be described with reference to FIG. 9. In addition to the above-described arrangement, the present embodiment is characterized in that inlet 21 and the outlet 22 of the cathode jacket 20 are connected by a circulation path 34 having a pump 42 and a water vessel 50 for raw material water in which an electrolyte is dissolved interposed halfway thereof.

The reason why the circulation path 34 is used is to effectively use water, which is one of objects. However, when water in which an electrolyte is dissolved is subjected to electrolysis, Ca$^+$, Si$^+$ (water silicate (SiO) is mixed into Si$^+$ to generate Si$^+$ by electric energy), Mg$^+$ and the like are separated and accumulated on the cathode electrode 3 to lower the conductivity. Therefore, in order to present the accumulation thereof from being progressed, water is used to be circulated to keep the conductivity at a predetermined level without accumulation of the cathode electrode 3 to maintain active electrolysis.

Figure 9:
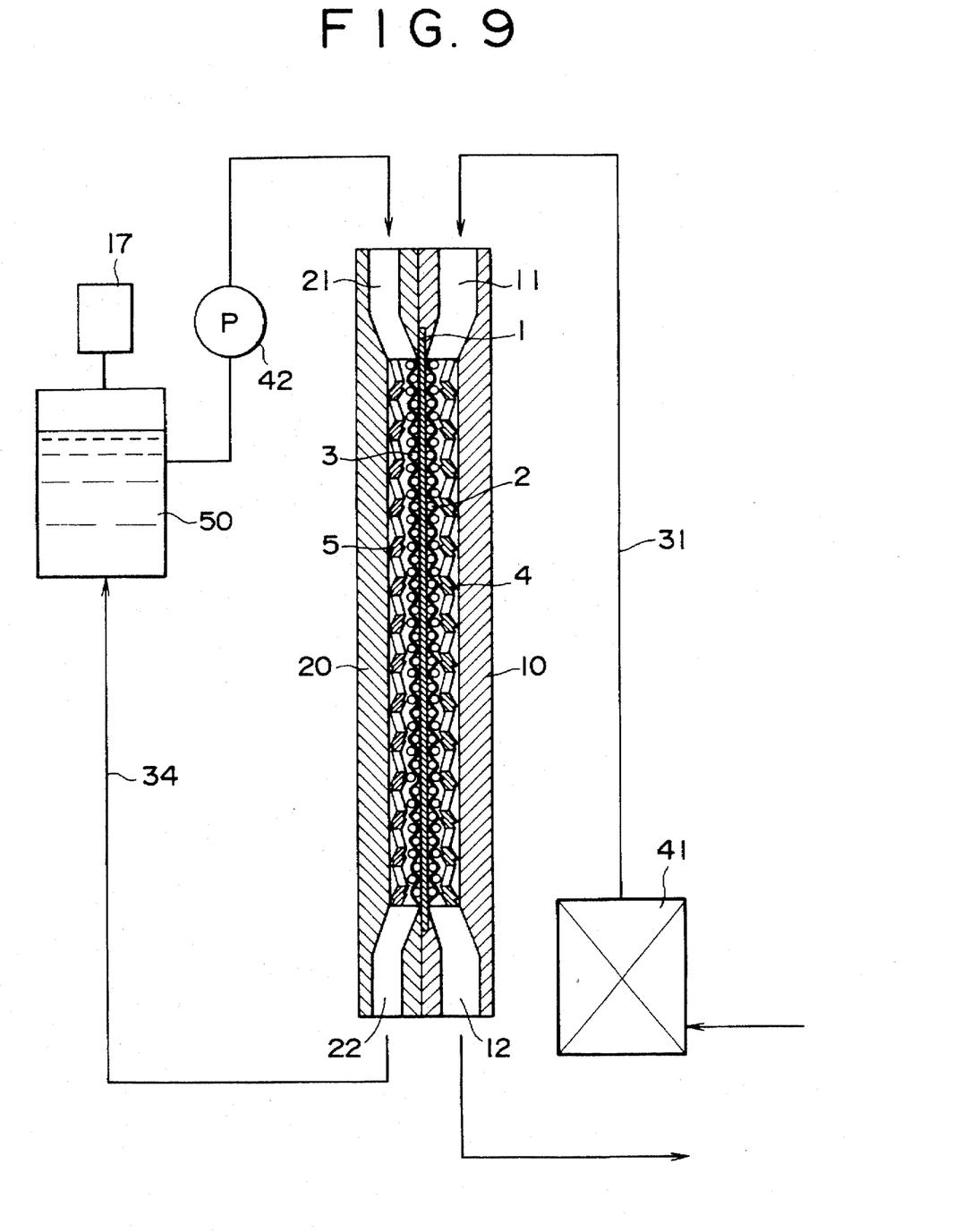
FIG. 9 is a longitudinal sectional view of essential parts showing another embodiment of the ozone water production apparatus according to the present invention.
Figure 10:
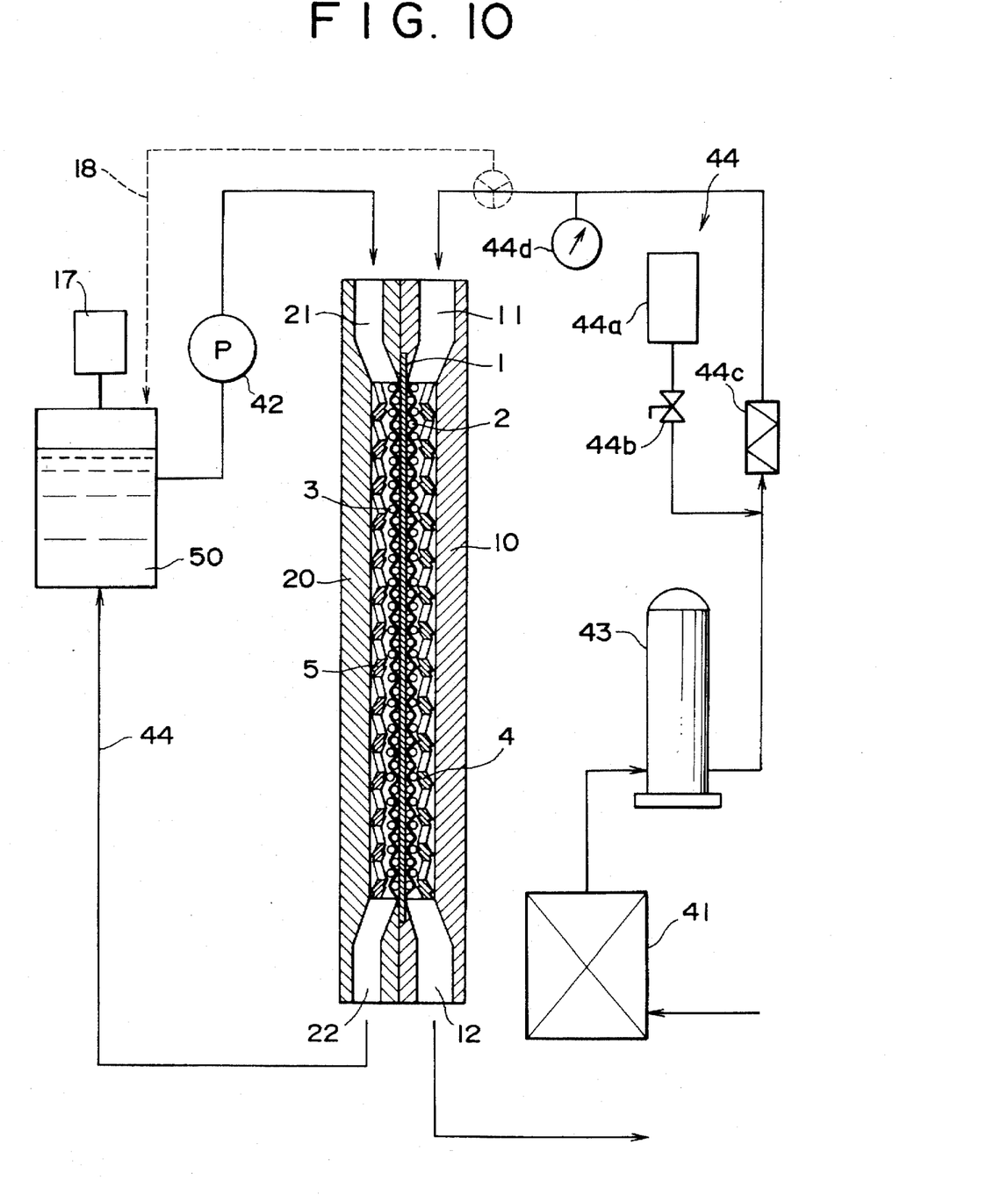
FIG. 10 is a longitudinal sectional view of essential parts showing still another embodiment of the ozone water production apparatus according to the present invention.

In FIGS. 9 and 10, reference numeral 17 designates a processing layer for burning or adsorbing hydrogen.

Preferably, the inlet 21 and the outlet 22 of the cathode jacket 20 can be connected by the circulation path 34 having a pump 42 and a water vessel 50 for raw material water in which calcium, magnesium and silicon being dissolved in water are removed to dissolve neutral salts interposed halfway thereof.

That is, according to the feature of the present invention, the raw material water in which calcium (Ca), magnesium (Mg) and silicon (Si) are removed to dissolve neutral salts is previously charged into the water vessel 10 in the embodiment shown in FIG. 9 to prevent calcium (Ca) or the like from being accumulated on the cathode electrode 3. In removing electrolytes such as calcium, chlorine is introduced into an activated charcoal layer (Cl) to thereby easily remove them. Since other electrolytes cannot be removed by the activated charcoal, it is introduced into an ion exchange resin to remove them. When a predetermined quantity of desired neutral salts are dissolved in water from which electrolyte is removed to form raw material water for example, in the case where water in which sodium chloride is dissolved in raw material water is used, $Na^+$ is bonded with $OH^+$ of water to form sodium hydroxide (NaOH), and sodium is not separated and accumulated on the cathode electrode 3. Further, when neutral salts are dissolved in water, a typical electrolyte is formed. Here, neutral salts are distinguished from electrolyte because the electrolyte is used in a wide sense.

In addition to the above-described arrangement, a water supply pipe 31 provided with a filter 41 halfway thereof and having an upstream end connected to a supply opening for city water or natural water can be connected to the inlet 11 of the anode jacket 10.

Water easily obtained is first city water, and next, water in rivers, a lake and a swamp, spring water, etc. Various materials are normally dissolved in advance into these water, which have a conductivity to some extent, and these can be used. In case of natural water, some solids are mixed therein, and they can be filtered by the filter 41. There is no fear that solids are mixed into city water, but instead, a relatively much amount of chlorine is mixed therein in our country. In the case where the chlorine need be removed, the filter 41 in which activated charcoal is put can be used to remove the chlorine.

Further, as shown in FIG. 10, in the water supply pipe 31, an ion exchange resin vessel 43 for removing a dissolved electrolyte can be installed at downstream of the filter 41, and an electrolyte dissolving device 44 for dissolving a desired electrolyte can be installed at further downstream thereof.

The well known ion exchange resin vessel 43 may be used, and the electrolyte dissolving resin vessel 44 is composed of an electrolyte receiving container 44a, and outflow control valve 44a and a mixing device 44c, the outflow control valve 44b being controlled by a conductive detector 44d or the like.

As described above, when a desired quantity of the desired electrolyte is dissolved into the anode jacket 10, the conductivity is kept to secure an active electrolysis. The stable operation can be made by keeping the conductivity at a predetermined level. On the side of the anode electrode 10, $Ca^+$ or the like are not electrically adsorbed by the anode electrode, and even if they are separated by electrolysis, they are not accumulated. Therefore, the electrolyte containing them can be used.

Impurities dissolved in city water or natural water are once removed, and a desired quantity of the desired electrolyte are dissolved by the electrolyte dissolving device 44 whereby the stable operation can be made to always obtain ozone water having a uniform quality.

More preferably, for the anode jacket 10, there is used a water supply pipe 31 having an ion exchange resin vessel 43 for removing a dissolved electrolyte installed at downstream of the filter 41, and an electrolyte dissolving device 44 for dissolving a desired electrolyte installed at further downstream thereof. The cathode jacket 20 is provided with an inlet 21 and an outlet 22, and there is used a circulation path 44 having a pump 42 and a water vessel 50 for raw material water for removing calcium, magnesium and silicon dissolved in water and dissolving neutral salts interposed halfway thereof.

In order to secure the conductivity, only one surface of the solid electrolytic film 1 is insufficient, and a flow of electrons passing through the solid electrolytic film 1 should be provided smoothly by both inlet and outlet sides. So, in the present invention, water in which an electrolyte is dissolved is supplied to both anode jacket 10 and cathode jacket 20, and in addition, a desired quantity of desired electrolyte are dissolved to secure the stable operation and the electrolyte is prevented from being separated and accumulated on the cathode electrode 3.

Further, in the above-described embodiment, neutral salts dissolved in water can be used, and as an electrolyte, either sodium chloride, potassium chloride or sodium sulfate can be used.

When sodium chloride, potassium chloride and sodium sulfate is used for the cathode jacket, the conductivity is prevented from being lowered without generation of the separated and accumulated substance. However, when these are used for the anode jacket 10, in case where sodium chloride is used, chlorine stays on the side of the anode electrode 2 (not moved from the cathode jacket 5 side), sodium moves to the cathode electrode 3 side, and on the anode electrode 2 side, chlorine and hydrogen ion of water are bonded to generate a hydrochloric acid (HCl), whereby obtaining acidic ozone water. In case of potassium chloride, the same as above results. In case of sodium sulfate, sulfuric acid ($H^2SO_4$) is generated. In case of ozone water in which a fine quantity of hydrochloric acid or sulfuric acid is dissolved, strong and sterilizing long lasting and bleaching forces can be expected for in comparison to hydrochloric acid as well as sulfuric acid. Since the present invention has paid attention to the fact that it takes a long time to attenuate the acidic ozone water in a neutral state. It has been considered as the result of experiments that in ozone water of pH 4, a half value period was approximately 6 times of neutral ozone water.

For the anode electrode 2, a wire net can be used in which metal wires formed of platinum (Pt), gold or metal mainly comprised of these metals are woven. Here, metal mainly comprised of platinum is one in which approximately 10% of rhodium is combined with platinum and gold. Use of platinum is well known, and it has been found that platinum promotes the formation of ozone. This platinum also has a function to contact-decompose ozone. In the present invention, however, ozone generated by the eddy current is immediately dissolved into water to minimize the contact decomposition to thereby prevent the ozone concentration of ozone water from being lowered. The anode electrode 2 is formed into a wire net, and the wire net together with the lath set secure a water permeability in the surface direction so that water can flow in possible contact with the surface of the solid electrolytic film 1.

Further, in the above-described embodiment, for the cathode electrode 3, a wire net can be used in which wires formed of silver (Ag), platinum or metal mainly comprised of platinum are woven. Silver is a good electric conductor. Such a use of this kind to the cathode electrode has been proposed from old. The reason therefore is not definite but it has been found that the quantity of ozone generation under the same using condition is several times of gold platinum which are similarly electric good conductors. It has been also confirmed from an aspect of phenomena that the accumulation of deposits caused by electrolysis of water was very small.

While in the present embodiment, a description has been made of an example in which a DC voltage is applied between an anode electrode formed from a wire net made of noble metal and a cathode electrode formed from a wire net made of metal, it is to be noted that a DC voltage may be applied between a lath net on the anode side placed upon the outer surface of the wire net made of noble metal and a lath net on the cathode side placed upon the outer surface of the wire net made of metal. Since both the lath nets are at many parts thereof in contact with the noble metal made wire net as the anode electrode and the metal made wire net as the cathode electrode, they can obtain substantially the same effect as that the case where the DC voltage is applied between the anode electrode formed from the wire net made of noble metal and the cathode electrode formed from them wire net made of metal. Further, since the lath net has a rigidity as compared with the noble metal made wire net and the metal made wire net, there is an effect that a voltage tends to be applied thereto.

For example, consideration is made of the case where an electric contact is provided between a wire net having a small rigidity and a terminal for applying a high voltage. In such a case, as methods for providing the electric contact, the following three methods can be considered.

1. Method for joining by welding, soldering, and the like
2. Method for securing by metal bolts, wires, and the like
3. Method for pressing Among them, in method (1), when welding, a thermal deformation occurs in the wire net to deteriorate the performance. In method (2), the wire net produces a protrusion on the opposite surface, and when this portion comes in contact with the solid electrolytic film, a shape different from that of other contact portions is formed on the surface of the solid electrolytic film, resulting in a deterioration of the performance such as a deterioration of the solid electrolytic film. In method (3), since the rigidity of the wire net is low, even if the terminal for applying a high voltage is pressed, the wire net becomes deformed to reduce the force of reaction, failing to obtain a good electric contact. Accordingly, an electric resistance increases, and when a high voltage is applied, heat is generated at the contact portion, thus failing to apply a high voltage necessary for electrolysis.

On the other hand, in the case where an electric contact is provided between the lath net having a high rigidity and the terminal for applying a high voltage, this is similar to the case where the rigidity is small for the aforementioned methods (1) and (2). However, in method (3), since the rigidity is high, the sufficient force of reaction can be obtained by pressing, and the sufficient electric contact can be obtained. Accordingly, the electric resistance of the contact portion is small, the amount of heat generation of the contact portion is small, and the high voltage necessary for electrolysis can be applied without waste.

SPECIFIC EXAMPLE

As a specific example, the apparatus shown in FIG. 1 was produced under the following conditions.

The solid electrolytic film 1 was a fluorine family cation exchange film, which had thickness 300 micron·10 cm×17 cm.

The cathode electrode 2 was formed by weaving platinum wires having 0.4 mm of a diameter into 80 meshes, the size being 8 cm×15 cm.

The lath nets 4 and 5 were formed by processing a plate having 1 mm of thickness made of titanium into a lath net having 50% of opening rate and 2 square cm of meshes to obtain 2.4 mm of maximum thickness, the size being 8 cm×15 cm.

Various operating conditions were examined in the above-described example. The ozone concentrations of ozone water obtained were as given in the following Table 1. For water, use was made of city water whose temperature is 20° C. and in which chlorine was removed by activated charcoal.

TABLE 1

| Voltage V | Current A/cm$^2$ | Water Flow +Side l/min | Water Flow −Side l/min | Concentration of ozone water |
| --- | --- | --- | --- | --- |
| 12 | 0.35 | 3 | 1.5 | 3.5 |
| 15 | 0.45 | 3 | 1.5 | 4.7 |
| 18 | 0.60 | 3 | 1.5 | 6.0 |
| 20 | 0.75 | 3 | 1.5 | 7.7 |
| 24 | 0.85 | 3 | 1.5 | 9.3 |
| 28 | 1.00 | 3 | 1.5 | 12.4 |
| 32 | 1.15 | 3 | 1.5 | 15.7 |
| 32 | 1.15 | 4.5 | 2.5 | 11.0 |
| 28 | 1.00 | 4.5 | 2.5 | 8.8 |

The above-described concentration of ozone was measured by an iodine coulometric titration method called an ozone counter ZC-15 type made by Hiranuma. The upper limit of voltage was 32 V. However, it can be easily assumed that if a voltage is increased, the concentration of ozone is improved. The solid electrolytic film 1 used in the present invention has been heretofore used. In the anode electrolysis, since a current above 5 A/cm$^2$ is used to flow, the amounts of current shown in Table 1 have a sufficient allowance for the durability of the solid electrolytic film 1.

What is claimed is:

1. An ozone water production apparatus for producing ozone water, comprising:

a solid electrolyte film;

a cathode electrode put upon one surface of said solid electrolytic film;

an anode electrode formed from a wire net put upon the other surface of said solid electrolytic film, a DC voltage being applied between said anode electrode and said cathode electrode for electrolysis of water;

an anode jacket having a water inlet on one end thereof and an ozone water outlet on the other end thereof to cover said anode electrode;

a cathode jacket having a water inlet on one end thereof and a water outlet on the other end thereof to cover said cathode electrode; and a lath net made of a corrosion-resistant metal positioned on the outer surface side of said anode electrode, said anode jacket covering said anode electrode and said lath net.

2. An ozone water production according to claim 1, wherein said anode electrode comprises a noble metal wire net having an ozone generation catalyst function.

3. An ozone water production according to claim 2, wherein said cathode electrode comprises a wire net made of metal.

4. An ozone water production according to claim 1, wherein said anode electrode and said lath net are snugly fit sealed into said anode jacket.

5. An ozone water production apparatus according to claim 1, wherein said apparatus further comprises:
 a supply opening for city water or natural water for supplying raw material water on the anode side to said anode jacket;
 a water supply pipe for connecting the water inlet of said anode jacket with the supply opening for said city water or natural water; and
 a circulation path for connecting the inlet and the outlet of said cathode jacket, said circulation path having a pump and a water vessel for raw material water on the cathode side in which an electrolyte having a high conductivity is dissolved interposed halfway thereof.

6. An ozone water production apparatus according to claim 5, wherein said electrolyte comprises sodium chloride, potassium chloride and sodium salts.

7. An ozone water production apparatus according to claim 5, wherein said raw material water on the cathode side is water in which calcium, magnesium and silicon dissolved in water are removed and neutral salts are dissolved.

8. An ozone water production apparatus according to claim 5, wherein a filter is disposed halfway of the water supply pipe for connecting the water inlet of said anode jacket with the supply opening for said city water or natural water.

9. An ozone water production apparatus according to claim 8, wherein said apparatus further comprises:
 an ion exchange resin disposed at downstream of said filter; and
 an electrolyte dissolving device interposed between said ion exchange resin and said water inlet of said anode electrode to dissolve the desired electrolyte.

10. An ozone water production apparatus according to claim 9, wherein said raw material water on the cathode side is water in which calcium, magnesium and silicon dissolved in water are removed and neutral salts are dissolved.

11. An ozone water production apparatus according to claim 1, wherein said anode electrode comprises a wire net formed by weaving wires formed of platinum, gold or metal comprising these metals.

12. An ozone water production apparatus according to claim 1, wherein said cathode electrode comprises a wire net formed by weaving wires formed of silver, platinum, or metal comprising platinum.

13. An ozone water production apparatus for producing ozone water, comprising:
 a solid electrolytic film;
 a cathode electrode formed from a metal made wire net put upon one surface of said solid electrolytic film;
 an anode electrode formed of a noble metal made wire net having an ozone generation catalyst function put upon the other surface of said solid catalytic film, a DC voltage being applied between said anode electrode and said cathode electrode for electrolysis of water;
 a lath net on the anode side made of a corrosion resistant metal put upon the outer surface side of said anode electrode;
 a lath net on the cathode side made of a corrosion resistant metal put upon the outer surface side of said cathode electrode;
 an anode jacket having a water inlet on one end thereof and an ozone water outlet on the other end thereof to cover said anode electrode and said lath net on the anode side; and
 a cathode jacket having a water inlet on one end and a water outlet on the other end thereof to cover said cathode electrode and said wire net on the cathode side.

14. An ozone water production apparatus according to claim 13, wherein said anode electrode and said lath net on the anode side are snugly fit into said anode jacket; and said cathode electrode and said lath net on the cathode side are sealed into said cathode jacket.

15. An ozone water production apparatus for producing ozone water, comprising:
 a solid electrolytic film;
 a cathode electrode formed from a metal made wire net put upon one surface of said solid electrolytic film;
 a wire net made of a noble metal having an ozone generation catalyst function put upon the other surface of said solid catalytic film;
 a lath net on the anode side made of a corrosion resistant metal put upon the outer surface side of said anode electrode;
 a lath net on the cathode side made of a corrosion resistant metal put upon the outer surface side of said cathode electrode a DC voltage being applied between said lath net on the anode side and said lath net on the cathode side for electrolysis of water;
 an anode jacket having a water inlet on one end thereof and an ozone water outlet on the other end thereof to cover said anode electrode and said lath net on the anode side; and
 a cathode jacket having a water inlet on one end and a water outlet on the other end thereof to cover said cathode electrode and said wire net on the cathode side.

16. An ozone water production apparatus for producing ozone water, comprising:
 a solid electrolyte film;
 a cathode electrode put upon one surface of said solid electrolytic film;
 an anode electrode formed from a wire net put upon the other surface of said solid electrolytic film, a DC voltage being applied between said anode electrode and said cathode electrode for electrolysis of water;
 an anode jacket having a water inlet on one end thereof and an ozone water outlet on the other end thereof to cover said anode electrode;
 a cathode jacket having a water inlet on one end thereof and a water outlet on the other end thereof to cover said cathode electrode; and
 a lath net made of a corrosion-resistant metal positioned on the outer surface side of said anode electrode, said anode jacket covering said anode electrode and said lath net.

* * * * *